(12) United States Patent
Sujan et al.

(10) Patent No.: US 11,207,967 B2
(45) Date of Patent: Dec. 28, 2021

(54) SYSTEMS AND METHODS FOR CONTROLLING A HYBRID ENGINE SYSTEM

(71) Applicant: Cummins Inc., Columbus, IN (US)

(72) Inventors: Vivek A. Sujan, Columbus, IN (US); Howard R. Frost, Columbus, IN (US); Arun Prakash Thunga Gopal, Columbus, IN (US)

(73) Assignee: Cummins Inc., Columbus, IN (US)

(*) Notice: Subject to any disclaimer, the term of this patent is extended or adjusted under 35 U.S.C. 154(b) by 255 days.

(21) Appl. No.: 16/464,877

(22) PCT Filed: Nov. 29, 2017

(86) PCT No.: PCT/US2017/063737
§ 371 (c)(1),
(2) Date: May 29, 2019

(87) PCT Pub. No.: WO2018/102428
PCT Pub. Date: Jun. 7, 2018

(65) Prior Publication Data
US 2019/0389450 A1 Dec. 26, 2019

Related U.S. Application Data

(60) Provisional application No. 62/428,882, filed on Dec. 1, 2016.

(51) Int. Cl.
B60K 6/48 (2007.10)
B60L 50/15 (2019.01)
(Continued)

(52) U.S. Cl.
CPC .............. B60K 6/48 (2013.01); B60L 50/15 (2019.02); B60W 10/02 (2013.01); B60W 10/06 (2013.01);
(Continued)

(58) Field of Classification Search
CPC .. B60K 2006/4825; B60K 6/387; B60K 6/48; B60L 15/2045; B60L 2240/423;
(Continued)

(56) References Cited

U.S. PATENT DOCUMENTS 4,407,132 A 10/1983 Kawakatsu et al.
6,453,222 B1 9/2002 Lasson et al.
(Continued)

FOREIGN PATENT DOCUMENTS

DE 10 2009 033 866 2/2011
WO WO-2018102428 A1 * 6/2018 .............. B60L 50/61

OTHER PUBLICATIONS

International Search Report and Written Opinion for International Application No. PCT/US2017/063737, dated Feb. 6, 2018, 8 pages.
(Continued)

Primary Examiner — Babar Sarwar
(74) Attorney, Agent, or Firm — Foley & Lardner LLP

(57) ABSTRACT

An apparatus includes a torque circuit and a clutch circuit. The torque circuit is structured to monitor a torque demand level of an engine. The clutch circuit is structured to (i) disengage an engine clutch of a transmission to decouple the engine from the transmission in response to the torque demand level of the engine falling below a threshold torque level and (ii) disengage a motor-generator clutch of the transmission to decouple a motor-generator from the engine in response to the torque demand level of the engine falling below the threshold torque level. The motor-generator is directly coupled to the transmission.

20 Claims, 7 Drawing Sheets

(51) Int. Cl.
  *B60W 10/02* (2006.01)
  *B60W 10/06* (2006.01)
  *B60W 10/08* (2006.01)
  *B60W 20/10* (2016.01)
  *B60W 20/40* (2016.01)

(52) U.S. Cl.
  CPC ............ *B60W 10/08* (2013.01); *B60W 20/10* (2013.01); *B60W 20/40* (2013.01)

(58) Field of Classification Search
  CPC .. B60L 2240/443; B60L 3/0015; B60L 50/15; B60L 50/16; B60L 50/61; B60L 58/10; B60W 10/02; B60W 10/023; B60W 10/06; B60W 10/08; B60W 20/00; B60W 20/10; B60W 20/11; B60W 20/12; B60W 20/14; B60W 20/20; B60W 20/40; B60W 2520/10; B60W 2540/10; B60W 2540/103; B60W 2540/12; B60W 2710/02; B60W 2710/021; B60W 2710/06; B60W 2710/08; B60W 2710/083; B60W 2720/106; B60W 30/14; B60W 30/18018; B60W 30/181; B60W 30/18127; B60W 30/18136; B60W 30/1884; F02N 11/04; F02N 11/0814; F02N 15/022; Y02T 10/62; Y02T 10/64; Y02T 10/70; Y02T 10/7072; Y02T 10/72
  See application file for complete search history.

(56) References Cited

U.S. PATENT DOCUMENTS

| | | | |
|---|---|---|---|
| 6,490,511 B1 * | 12/2002 | Raftari | B60W 20/11 701/22 |
| 6,971,968 B2 | 12/2005 | Imazu et al. | |
| 7,154,236 B1 * | 12/2006 | Heap | B60W 10/06 318/9 |
| 8,617,028 B2 * | 12/2013 | Kresse | B60L 15/2054 477/5 |
| 8,808,140 B2 | 8/2014 | Reed et al. | |
| 9,290,093 B2 * | 3/2016 | Turner | B60K 1/04 |
| 9,573,596 B2 * | 2/2017 | Kuhn | A01C 23/047 |
| 9,623,864 B2 * | 4/2017 | Kresse | B60W 20/00 |
| 9,718,462 B2 * | 8/2017 | Yamazaki | B60W 10/11 |
| 2002/0052677 A1 * | 5/2002 | Lasson | B60W 10/08 701/22 |
| 2004/0000887 A1 * | 1/2004 | Lim | B60L 15/10 318/432 |
| 2004/0174124 A1 * | 9/2004 | Lee | B60K 6/485 318/139 |
| 2005/0230976 A1 * | 10/2005 | Yang | B60L 50/16 290/4 R |
| 2006/0230855 A1 | 10/2006 | Leibbrandt et al. | |
| 2007/0102207 A1 * | 5/2007 | Yamanaka | B60W 10/02 180/65.31 |
| 2009/0018716 A1 * | 1/2009 | Ambrosio | B60L 58/20 701/22 |
| 2013/0096758 A1 | 4/2013 | Yuille et al. | |
| 2013/0297120 A1 * | 11/2013 | Reed | B60L 58/12 701/22 |
| 2014/0088805 A1 * | 3/2014 | Tulpule | B60W 10/02 701/22 |
| 2014/0095004 A1 | 4/2014 | Kresse et al. | |
| 2015/0149008 A1 | 5/2015 | Jang | |
| 2017/0137029 A1 * | 5/2017 | Dynes | B60W 30/18072 |

OTHER PUBLICATIONS

U.S. Final Office Action Issued for U.S. Appl. No. 14/307,023, dated Jun. 13, 2016, 9 pages.
U.S. Office Action Issued for U.S. Appl. No. 14/100,850, dated Jan. 7, 2016, 10 pages.

* cited by examiner

SYSTEMS AND METHODS FOR CONTROLLING A HYBRID ENGINE SYSTEM

CROSS-REFERENCE TO RELATED PATENT APPLICATIONS

The present application claims the benefit of and priority to U.S. Provisional Patent Application No. 62/428,882, filed Dec. 1, 2016, which is incorporated herein by reference in its entirety and for all purposes.

TECHNICAL FIELD

The present application relates generally to the field of engine stop-start. More particularly, the present application relates to systems and methods for managing engine stop-start in various applications, such as with mild-hybrid vehicles.

BACKGROUND

Hybrid drivetrains propel a vehicle using an electric motor and an internal combustion engine. The electric motor may mechanically couple to the drivetrain to directly provide power thereto. The internal combustion engine may mechanically couple to the drivetrain to directly provide power thereto or to provide energy to a generator to generate electrical energy for use by the motor. Hybrid vehicles may employ stop-start strategies that selectively turn the engine on and off based on various demands of the vehicle.

SUMMARY

One embodiment relates to an apparatus. The apparatus includes a torque circuit and a clutch circuit. The torque circuit is structured to monitor a torque demand level of an engine. The clutch circuit is structured to (i) disengage an engine clutch of a transmission to decouple the engine from the transmission in response to the torque demand level of the engine falling below a threshold torque level and (ii) disengage a motor-generator clutch of the transmission to decouple a motor-generator from the engine in response to the torque demand level of the engine falling below the threshold torque level. The motor-generator is directly coupled to the transmission.

Another embodiment relates to a method. The method includes monitoring, by a processing circuit, a torque demand level of an engine; comparing, by the processing circuit, the torque demand level to a first threshold torque level and a second threshold torque level; disengaging, by the processing circuit, a clutch positioned to selectively couple (i) the engine to a transmission and (ii) the engine to a motor-generator in response to the torque demand level dropping below the first threshold torque level; and engaging, by the processing circuit, the clutch based on a comparison of the toque demand level and the second threshold torque level. The first threshold torque level is non-positive. The motor-generator is coupled to the transmission such that the motor-generator utilizes a negative torque level to generate energy while the engine is decoupled from the transmission.

Another embodiment relates to a system. The system includes a controller communicably and operatively coupled to a first clutch and a second clutch of a transmission. The first clutch is positioned to selectively couple an engine to the transmission. The second clutch is positioned to selectively couple a motor-generator to the engine. The controller is structured to monitor a torque demand level of the engine, compare the torque demand level to a first threshold torque level, disengage the first clutch and the second clutch to decouple the engine from the transmission and the motor-generator from the engine in response to the torque demand level dropping below the first threshold torque level, and transmit an off signal to an engine controller to turn the engine off in response to the torque demand level dropping below the first threshold torque level. The first threshold torque level is non-positive. The motor-generator is coupled to the transmission such that the motor-generator utilizes a negative torque level to generate energy for storage in an energy storage device while the engine is decoupled from the transmission.

These and other features, together with the organization and manner of operation thereof, will become apparent from the following detailed description when taken in conjunction with the accompanying drawings.

DETAILED DESCRIPTION

Figure 1:
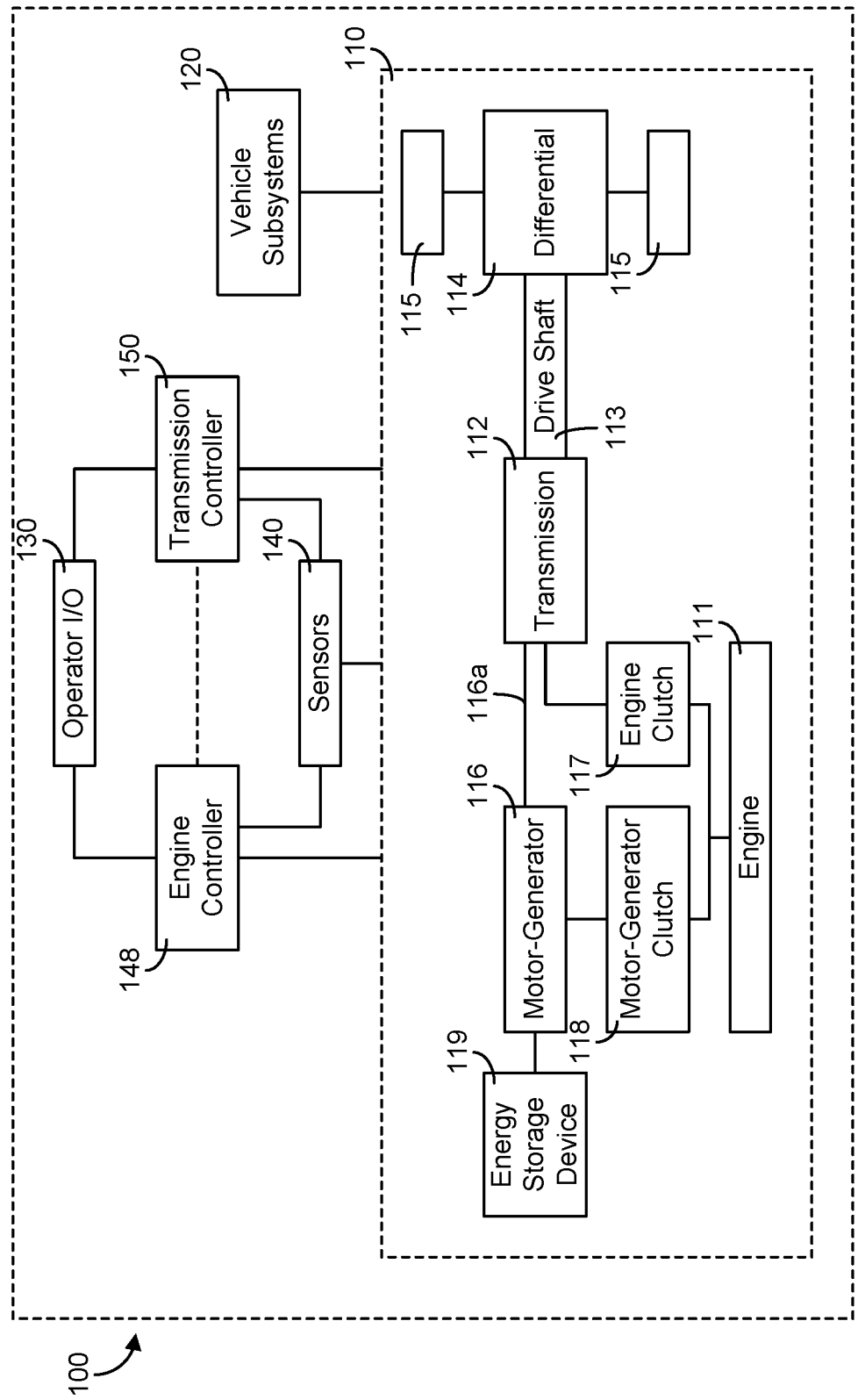
FIG. 1 is a schematic diagram of a vehicle with a controller, according to an example embodiment.

Following below are more detailed descriptions of various concepts related to, and implementations of, methods, apparatuses, and systems for controlling a hybrid engine system. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods for controlling a hybrid engine system, and more specifically to a mild hybrid system (e.g., a mild parallel hybrid system, etc.) and options for integrating a motor-generator therein (e.g., a 20-25 kilowatt motor-generator; a low cost, low voltage system for heavy duty and/or mid-range duty on-highway and/or off-highway engines; etc.). Functions of a mild hybrid system may include (i) regeneration (e.g., harnessing driveline energy during deceleration, etc.), (ii) energy storage management (e.g., storing the regenerative energy, etc.), and/or (iii) propulsion (e.g., using the stored regenerated energy for positive work, such as providing power for vehicle propulsion, engine cranking, operating accessories, driving a power take-off (PTO), etc.). Such functions may be used to reduce vehicle and/or system fuel consumption relative to a conventional or non-hybrid powertrain (e.g., over a given mission, route, etc.).

According to an example embodiment, the motor-generator of the mild hybrid system may be integrated into the powertrain thereof in two ways. First, the motor-generator may be directly coupled to the engine (e.g., through a variety of options such as gears, chain/sprocket, belts/pulley, etc.). Second, the motor-generator may be coupled indirectly to the engine (e.g., through a variety of coupling mechanisms such as clutches, torque couplers, etc.).

Similar to the mechanical coupling options, the control system may be separated into two categories: (i) a first control system managed by an engine controller with access to engine system information (e.g., bottom cruise droop, engine brake deadband, etc.) and publicly broadcasted information (e.g., current vehicle speed, cruise control set speed, etc.) and (ii) a second control system managed by a transmission controller with access to transmission system information and the publicly broadcasted information, but optionally with access to the engine system information. The second control system may thereby additionally employ adaptive learning strategies to determine (e.g., estimate, etc.) the engine system information if access thereto is not provided.

In a first option, the motor-generator may be directly coupled to the engine crankshaft (e.g., through a linkage like gears, pulleys, chain drive, etc.). The motor-generator may thereby be setup in the "engine space" and controlled by the engine controller (e.g., not some other powertrain subsystem controller, etc.). In a second option, the motor-generator may be indirectly coupled to the engine crankshaft (e.g., through a linkage like a clutch, etc.) and able to maintain connection to the driveline even when decoupled from the engine. The motor-generator may be setup in the "engine space", "transmission space" or some other "subsystem space" and controlled by the engine controller, the transmission controller, and/or another controller.

Referring now to FIG. 1, a schematic diagram of a vehicle 100 with a transmission controller 150 is shown according to an example embodiment. As shown in FIG. 1, the vehicle 100 generally includes a powertrain system 110, vehicle subsystems 120, an operator input/output (I/O) device 130, sensors 140 communicably coupled to one or more components of the vehicle 100, an engine controller 148, and the transmission controller 150. The vehicle 100 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, delivery trucks, and any other type of vehicle which may include a stop-start feature and/or a hybrid powertrain system. According to an example embodiment, the powertrain system 110 of the vehicle 100 is structured as a hybrid powertrain system. In some embodiments, the powertrain system 110 of the vehicle 100 is structured as a full electric powertrain system.

Components of the vehicle 100 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the transmission controller 150 may be communicably coupled to the systems and components in the vehicle 100 of FIG. 1, the transmission controller 150 may be structured to receive data regarding one or more of the components shown in FIG. 1. For example, the data may include engine data regarding the operating characteristics of an engine (e.g., vehicle speed, cruise control set speed, etc.) and/or other components (e.g., a battery system, a motor-generator, a regenerative braking system, etc.) acquired by one or more sensors, such as sensors 140. As another example, the data may include an input from operator I/O device 130. As still another example, the data may include route look-ahead data regarding route characteristics received from a route look-ahead system. The transmission controller 150 may at least partially control operation of one or more components of the powertrain system 110 based on such data.

As shown in FIG. 1, the powertrain system 110 includes an engine 111, a transmission 112 having an engine clutch 117 and a motor-generator clutch 118, a drive shaft 113, a differential 114, a final drive 115, a motor-generator 116, and an energy storage device 119. The engine 111 may be structured as any engine type, including a spark-ignition internal combustion engine, a compression-ignition internal combustion engine, and/or a fuel cell, among other components. The engine 111 may be powered by any fuel type (e.g., diesel, ethanol, gasoline, natural gas, propane, hydrogen, etc.). Similarly, the transmission 112 may be structured as any type of transmission, such as a continuous variable transmission, a manual transmission, an automatic transmission, an automatic-manual transmission, a dual clutch transmission, and so on.

Accordingly, as transmissions vary from geared to continuous configurations (e.g., continuous variable transmission), the transmission may include a variety of settings (gears, for a geared transmission) that affect different output speeds based on an input speed received thereby (e.g., from the engine 111, the motor-generator 116, etc.). Like the engine 111 and the transmission 112, the drive shaft 113, differential 114, and final drive 115 may be structured in any configuration dependent on the application (e.g., the final drive 115 is structured as wheels in an automotive application, as a propeller in a boat application, etc.). Further, the drive shaft 113 may be structured as any type of drive shaft including, but not limited to, a one-piece, two-piece, and a slip-in-tube driveshaft based on the application.

The motor-generator 116 may include a motor and a generator. In some embodiments, the motor and the generator are individual components of the motor-generator 116. In some embodiments, the motor and the generator are a single device having both generating and motoring capabilities. As shown in FIG. 1, the motor-generator 116 is electrically coupled to the energy storage device 119. In some embodiments, the motor-generator 116 is structured to receive stored electrical energy from the energy storage device 119 to facilitate operation thereof (e.g., facilitate operation as a motor, etc.). In some embodiments, the motor-generator 116 is structured to generate electrical energy for storage in the energy storage device 119 for future use and/or to power electrically-powered vehicle accessories (e.g., facilitate operation as a generator, etc.).

According to an example embodiment, the energy storage device 119 includes one or more batteries (e.g., high voltage batteries, a lead-acid battery, a lithium-ion battery, etc.), one or more capacitors (e.g., super capacitors, etc.), and/or any other energy storage devices. In one embodiment, the energy storage device 119 is electrically coupled to the motor-generator 116 and/or the vehicle subsystems 120 (e.g., a regenerative braking system, etc.). The energy storage device 119 may be structured to store electrical energy generated by the motor-generator 116 and/or generated by a regenerative braking system. The energy storage device 119 may be structure to provide the stored electrical energy to (i) the vehicle subsystems 120 to operate various electrical based components of the vehicle 100 (e.g., while the engine 111 is running, while the engine 111 is off, etc.), (ii) the engine 111 to start the engine 111 (e.g., in response to a restart command after the stop-start feature turns off the engine 111, when an operator keys on the engine 111, etc.), and/or to the motor-generator 116 to operate the motor-generator 116 in a motoring mode.

As shown in FIG. 1, the engine clutch 117 is positioned to selectively couple the engine 111 to the transmission 112 and the motor-generator clutch 118 is positioned to selectively couple the motor-generator 116 to the engine 111 (e.g., indirectly coupled thereto via the motor-generator clutch 118, etc.). According to the example embodiment shown in FIG. 1, the motor-generator 116 is directly coupled to the transmission 112 via a linkage 116a. The linkage 116a may include a variety of different couplers including gear system, a chain and sprocket system, a belt and pulley system, and/or still another type of mechanical coupler. In some embodiments, the linkage 116a additionally or alternatively electrically couples the motor-generator 116 to the transmission 112 (e.g., the transmission controller 150 thereof, etc.). According to an example embodiment, the arrangement of the transmission 112 shown in FIG. 1 is structured to facilitate generating energy with the motor-generator 116 while the engine 111 is decoupled from and/or coupled to the transmission 112 (e.g., while the engine clutch 117 is engaged, disengaged, etc.), and while the motor-generator 116 is decoupled from the engine 111 (e.g., while the motor-generator clutch 118 is disengaged, etc.). In some embodiments, the transmission 112 does not include the motor-generator clutch 118. In such embodiments, the motor-generator 116 may be (i) directly coupled to the engine 111 (e.g., via a belt, a chain drive, gears, a pulley, etc.) and indirectly coupled to the transmission 112 (e.g., through the engine 111, etc.) or (ii) directly coupled to the transmission 112 via the linkage 116a and indirectly coupled to the engine 111 through the transmission 112.

According to an exemplary embodiment, the powertrain system 110 is a mild-hybrid powertrain system. The motor-generator 116 may thereby provide mild hybridization to the powertrain system 110. For example, the motor-generator 116 may be a low cost, low voltage, and/or low power (e.g., 20-25 kilowatt capacity, etc.) motor-generator.

In a traditional, non-hybrid powertrain system, the engine 111 receives a chemical energy input (e.g., a fuel such as gasoline, diesel, etc.) and combusts the fuel to generate mechanical energy, in the form of a rotating crankshaft. The transmission 112 receives the rotating crankshaft and manipulates the speed of the crankshaft (e.g., the engine revolutions-per-minute (RPM), etc.) to affect a desired drive shaft speed. The rotating drive shaft 113 is received by the differential 114, which provides the rotation energy of the drive shaft 113 to the final drive 115. The final drive 115 then propels or moves the vehicle 100. In the powertrain system 110 of the present disclosure, the transmission 112 may receive an input from at least one of the motor-generator 116 and the engine 111, as well as the motor-generator 116 may utilize a negative torque supply to perform energy regeneration (e.g., while the engine 111 is decoupled form the transmission 112, while the engine 111 is providing engine braking, etc.).

Referring still to FIG. 1, the vehicle 100 includes the vehicle subsystems 120. The vehicle subsystems 120 may include the regenerative braking system. The regenerative braking system may include various components structured to generate electricity from vehicle braking events to at least one of (i) power the motor-generator 116 and/or various electrical components of the vehicle 100, and (ii) be stored by the energy storage device 119 for future use (e.g., by the motor-generator 116, by the electrical vehicle components, etc.). The vehicle subsystems 120 may include other components including mechanically driven or electrically driven vehicle components (e.g., HVAC system, lights, pumps, fans, etc.). The vehicle subsystems 120 may also include any component used to reduce exhaust emissions, such as selective catalytic reduction (SCR) catalyst, a diesel oxidation catalyst (DOC), a diesel particulate filter (DPF), a diesel exhaust fluid (DEF) doser with a supply of diesel exhaust fluid, a plurality of sensors for monitoring the aftertreatment system (e.g., a nitrogen oxide (NOx) sensor, temperature sensors, etc.), and/or other components.

The operator I/O device 130 may enable an operator of the vehicle 100 (or passenger) to communicate with the vehicle 100 and the transmission controller 150. By way of example, the operator I/O device 130 may include, but is not limited to, an interactive display, a touchscreen device, one or more buttons and switches, voice command receivers, and the like. In one embodiment, the operator I/O device 130 includes a brake and an accelerator pedal. The sensors 140 may include sensors positioned and/or structured to monitor operating characteristics of various components of the vehicle 100. By way of example, the sensors 140 may include an engine sensor structure to facilitate monitoring operating characteristics of the engine 111, battery sensors structured to facilitate monitoring operating characteristics of the energy storage device 119 and/or the flow of electricity into and/or out of the energy storage device 119 (e.g., current, voltage, power, state of charge, etc.), transmission sensors structured to facilitate monitoring operating characteristics of the transmission 112, the engine clutch 117, and/or the motor-generator clutch 118.

As the components of FIG. 1 are shown to be embodied in the vehicle 100, the transmission controller 150 may be structured as a transmission control unit and the engine controller 148 may be structured as an electronic control module (ECM). The ECM may include any other vehicle control unit (e.g., exhaust aftertreatment control unit, etc.). The function and structure of the transmission controller 150 is described in greater detail herein in relation to FIG. 2.

Figure 2:
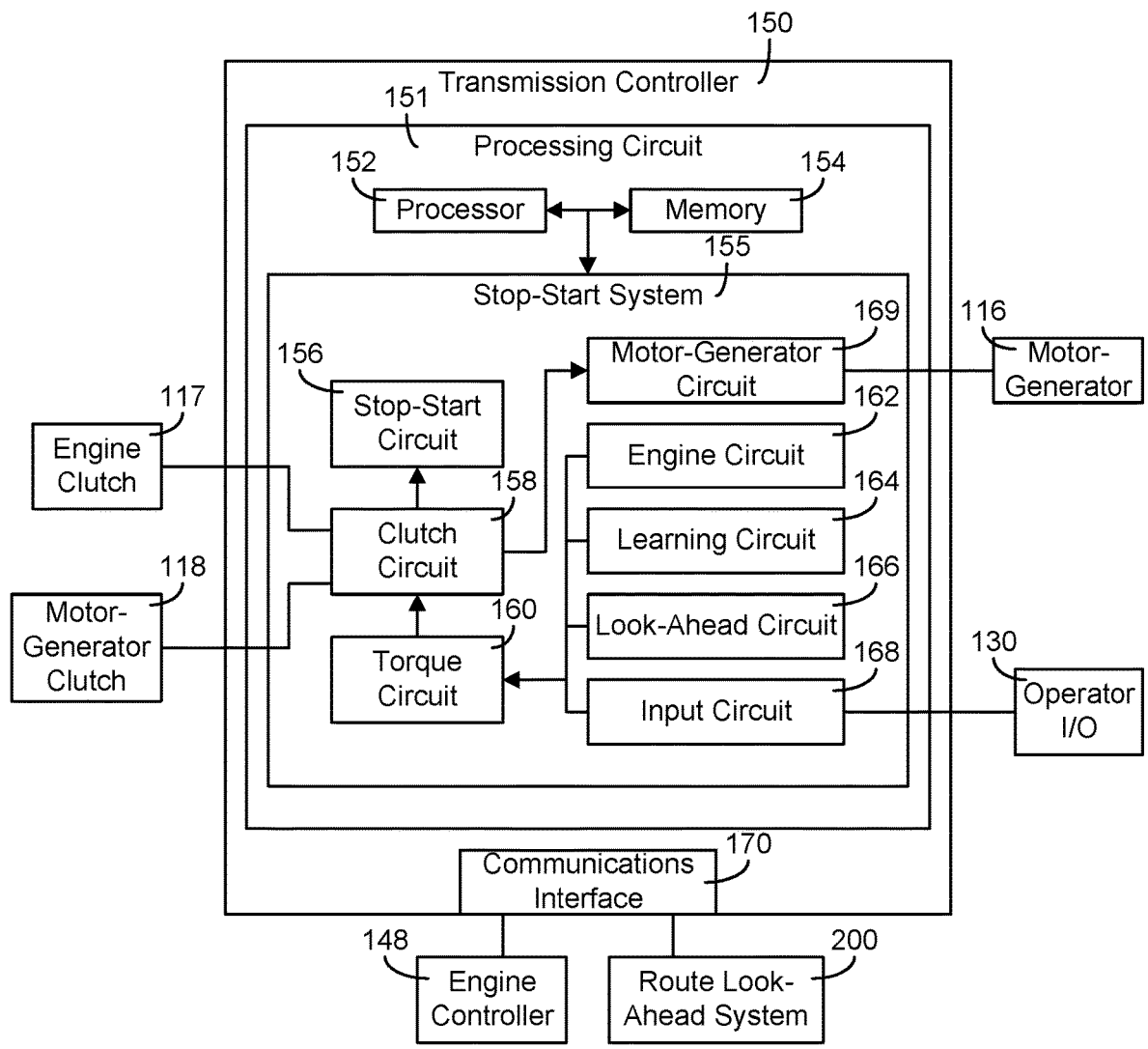
FIG. 2 is a schematic diagram of the controller of the vehicle of FIG. 1, according to an example embodiment.

Referring now to FIG. 2, a schematic diagram of the transmission controller 150 of the vehicle 100 of FIG. 1 is shown according to an example embodiment. As shown in FIG. 2, the transmission controller 150 includes a processing circuit 151 and a communications interface 170. The processing circuit 151 includes a processor 152, a memory 154, and a stop-start system 155. The processor 152 may be implemented as a general-purpose processor, an application specific integrated circuit (ASIC), one or more field programmable gate arrays (FPGAs), a digital signal processor (DSP), a group of processing components, or other suitable electronic processing components. The memory 154 (e.g., RAM, ROM, Flash Memory, hard disk storage, etc.) may store data and/or computer code for facilitating the various processes described herein. The memory 154 may be communicably connected to the processor 152 and the stop-start system 155 and structured to provide computer code or instructions to the processor 152 for executing the processes described in regard to the stop-start system 155 herein.

Moreover, the memory 154 may be or include tangible, non-transient volatile memory or non-volatile memory. Accordingly, the memory 154 may include database components, object code components, script components, or any other type of information structure for supporting the various activities and information structures described herein.

The stop-start system 155 includes various circuits for completing the activities described herein. More particularly, the stop-start system 155 includes a stop-start circuit 156, a clutch circuit 158, a torque circuit 160, an engine circuit 162, a learning circuit 164, a look-ahead circuit 166, an input circuit 168, and a motor-generator circuit 169. The circuits 156-169 are structured to control the transmission 112 (e.g., the engine clutch 117, the motor-generator clutch 118, etc.) of the powertrain system 110 of the vehicle 100. While various circuits with particular functionality are shown in FIG. 2, it should be understood that the transmission controller 150, the stop-start system 155, and/or the memory 154 may include any number of circuits for completing the functions described herein. For example, the activities and functionalities of circuits 156-169 may be embodied in the memory 154, or combined in multiple circuits or as a single circuit. Additional circuits with additional functionality may also be included. Further, it should be understood that the transmission controller 150 may further control other activity beyond the scope of the present disclosure.

According to one embodiment, the circuits 156-169 may include communication circuitry structured to facilitate the exchange of information, data, values, non-transient signals, etc. between and among the circuits 156-169, the engine controller 148, the route look-ahead system 200, the motor-generator 116, the engine clutch 117, the motor-generator clutch 118, the operator I/O device 130, the sensors 140, and/or other components of vehicle 100. For example, the communication circuitry may include a channel comprising any type of communication channel (e.g., fiber optics, wired, wireless, etc.), and the channel may include any additional component for signal enhancement, modulation, demodulation, filtering, and the like. In this regard, the circuits 156-169 may include communication circuitry including, but not limited to, wired and wireless communication protocols to facilitate reception and transmission of data.

In another embodiment, the circuits 156-169 may include machine-readable media stored by the memory 154 and executable by the processor 152. The machine-readable media facilitates performance of certain operations to facilitate reception and transmission of data. For example, the machine-readable media may provide an instruction (e.g., command, etc.) to the sensors 140, the route look-ahead system 200, the engine controller 148, etc. to acquire the data. In this regard, the machine-readable media may include programmable logic that defines the frequency of acquisition of the data. In yet another embodiment, the circuits 156-169 may include any combination of machine-readable content, communication circuitry, the motor-generator 116, the engine clutch 117, the motor-generator clutch 118, the operator I/O device 130, the sensors 140, and/or other components of vehicle 100.

Certain operations of the transmission controller 150 described herein may include operations to interpret and/or to determine one or more parameters. Interpreting or determining, as utilized herein, include receiving values by any method known in the art, including at least receiving values from a datalink or network communication, receiving an electronic signal (e.g., a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The communications interface 170 may include wired or wireless interfaces (e.g., jacks, antennas, transmitters, receivers, transceivers, wire terminals, etc.) for conducting data communications with various systems, devices, or networks. For example, the communications interface 170 may include an Ethernet card and port for sending and receiving data via an Ethernet-based communications network and/or a Wi-Fi transceiver for communicating via a wireless communications network. The communications interface 170 may be structured to communicate via local area networks or wide area networks (e.g., the Internet, etc.) and may use a variety of communications protocols (e.g., IP, LON, Bluetooth, ZigBee, radio, cellular, near field communication, etc.).

The communications interface 170 of the transmission controller 150 may facilitate communication between and among the transmission controller 150, the stop-start system 155, and/or components of the vehicle 100 (e.g., the engine 111, the transmission 112, the motor-generator 116, the engine clutch 117, the motor-generator clutch 118, the energy storage device 119, the operator I/O device 130, the sensors 140, etc.). The communications interface 170 of the transmission controller 150 may additionally or alternatively facilitate communication between and among the stop-start system 155 and the transmission controller 150, the engine controller 148, and/or a route look-ahead system 200 (e.g., an eHorizon system, a remote server, a global positioning system (GPS), etc.). Communication between and among the transmission controller 150, the stop-start system 155, the components of the vehicle 100 (e.g., the engine 111, the transmission 112, the motor-generator 116, the engine clutch 117, the motor-generator clutch 118, the energy storage device 119, the operator I/O device 130, the sensors 140, etc.), the engine controller 148, and/or the route look-ahead system 200 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The torque circuit 160 may be structured to monitor a torque demand level of the engine 111. The torque circuit 160 may additionally be structured to compare the torque demand level to a first threshold torque level. By way of example, the torque circuit 160 may be structured to determine whether the torque demand level drops below the first threshold torque level. According to an example embodiment, the first threshold torque level is non-positive. The first threshold torque level may thereby be less than or equal to a net zero torque demanded from the engine (e.g., a negative torque demand, etc.). A negative or zero torque demand may occur when no input torque is needed from the engine to maintain a desired speed of the vehicle 100 (e.g., when traveling down a hill or decline, when the current speed is higher than a cruise control set speed, etc.).

The torque circuit 160 may additionally or alternatively be structured to compare the torque demand level to a second threshold torque level. By way of example, the torque circuit 160 may be structured to determine whether the torque demand level increases above the second threshold torque level (e.g., after the torque demand level initially drops below the first threshold torque level, etc.). According to an example embodiment, the second threshold torque level is selected (e.g., calibrated, set, predefined, etc.) to compensate for engagement delays of the engine clutch 117 and/or the motor-generator clutch 118 when a torque input is subsequently desired or required from the engine 111 (e.g., in response to the speed of the vehicle 100 decreasing, in response to an operator input via an accelerator pedal, etc.). By way of example, the second threshold torque level may be less than the first threshold torque level to eliminate delays in torque provided by the engine 111 due to time delays associated with engaging the engine clutch 117 and/or the motor-generator clutch 118. The second threshold torque level may thereby be a negative torque value that is less than the first threshold torque level. By way of another example, the second threshold torque level may be equal to the first threshold torque level. In an alternative embodiment, the second threshold torque level is greater than the first threshold torque level.

The engine circuit 162 may be structured to receive engine parameters from the engine controller 148 via the communications interface 170. The engine parameters received from the engine controller 148 may include (i) non-publicly broadcasted engine parameters such as cruise control droop settings and engine brakes deadband of the engine 111 and/or (ii) publicly broadcasted engine parameters such as current vehicle speed and cruise control set speed. The reception of the non-publicly broadcasted engine parameters and the publicly broadcasted engine parameters from the engine controller 148 (e.g., a handshake between the transmission controller 150 and the engine controller 148, etc.) may be used by the torque circuit 160 as further described herein. In some embodiments, the transmission controller 150 does not have permission or access to the non-publicly broadcasted engine parameters. In such embodiments, the learning circuit 164 may be structured to adaptively estimate and determine the non-publicly broadcasted engine parameters by monitoring a series of driving events of the vehicle 100 as described more fully herein.

The learning circuit 164 may be structured to monitor one or more driving events of the vehicle 100 (e.g., the first few miles of a trip, etc.) to estimate and converge on values for the non-publicly broadcasted engine parameters (e.g., if they are not provided by the engine controller 148, etc.). By way of example, the learning circuit 164 may be structured to monitor publicly broadcasted parameters to derive the non-publicly broadcasted engine parameters. For example, one possible mechanism to determine the vehicle speed at which engine braking is applied is that the learning circuit 164 may be structured to monitor a first engine braking event and derive a constant offset value for bottom cruise droop and engine braking deadband. This may be done by monitoring a publicly broadcasted characteristic (e.g., actual retarder percent torque, etc.) to determine when engine braking is applied. The estimation of the non-publicly broadcasted engine parameters by the learning circuit 164 and the reception of the publicly broadcasted engine parameters from the engine controller 148 by the engine circuit 162 may be used by the torque circuit 160 as further described herein.

The look-ahead circuit 166 may be structured to receive route look-ahead data indicative of route characteristics ahead of the vehicle 100 from the route look-ahead system 200 via the communications interface 170. The route characteristics may include characteristics such as an incline, a decline, a slope, a curve, a change in speed limit, an upcoming stop sign or stop light, and/or still other route characteristics. The route characteristics may be used by the torque circuit 160 as further described herein.

The input circuit 168 may be structured to receive an input from an operator of the vehicle 100 via the operator I/O device 130. The input may include an accelerator pedal position. The input circuit 168 may additionally be structured to receive publicly broadcasted engine parameters such as engine net brake torque and engine percent load at current speed. Such information may be used by the input circuit 168 to determine a desired operator torque (e.g., the torque demand level, etc.) used by the torque circuit 160.

The torque circuit 160 may additionally or alternatively be structured to estimate and/or predict the torque demand level based on the route look-ahead data received by the look-ahead circuit 166. By way of example, the route look-ahead data may indicate upcoming route characteristics (e.g., an incline, a curve, a speed limit increase, etc.) may likely cause the torque demand level to increase above the second threshold torque level. Such determinations may facilitate preemptively engaging the engine clutch 117 and/or the motor-generator clutch 118 in anticipation of an increased torque demand level (e.g., an approaching incline, etc.).

The torque circuit 160 may additionally or alternatively be structured to generate an engine braking signal in response to determining an engine braking event is present (e.g., engine braking is needed, while the torque demand level is less than the first threshold torque level and has not increased above the second threshold torque level, etc.) based on at least one of (i) the publicly and/or non-publicly broadcasted engine parameters received from the engine controller 148 by the engine circuit 162, (ii) the non-publicly broadcasted engine parameters determined using adaptive learning techniques by the learning circuit 164, and (iii) the route look-ahead characteristics received from the route look-ahead system 200 by the look-ahead circuit 166. By way of example, the torque circuit 160 may be structured to determine that engine braking may be needed in response to the current vehicle speed exceeding the cruise control set speed by more than a threshold speed amount (e.g., more than the cruise control droop settings and the engine braking deadband of the engine 111, etc.) based on the non-publicly broadcasted engine parameters received from the engine controller 148 and/or determined by the learning circuit 164. By way of another example, the torque circuit 160 may be structured to determine that engine braking may be needed based on upcoming route characteristics (e.g., an approaching decline, etc.). Such determinations may facilitate preemptively engaging the engine clutch 117 in anticipation of an increased vehicle speed to facilitate providing engine braking with the engine 111 as needed.

The clutch circuit 158 may be structured to transmit commands (e.g., an engagement signal, a disengagement signal, etc.) to the engine clutch 117 to selectively couple the engine 111 to or selectively decouple the engine 111 from the transmission 112. The clutch circuit 158 may additionally or alternatively be structured to transmit commands (e.g., an engagement signal, a disengagement signal, etc.) to the motor-generator clutch 118 to selectively couple the motor-generator 116 to or selectively decouple the motor-generator 116 from the engine 111. By way of example, the clutch circuit 158 may be structured to transmit an engagement signal to the engine clutch 117 and the motor-generator clutch 118 such that (i) the engine 111 is coupled to the transmission 112 and the motor-generator 116 and (ii) the motor-generator 116 is coupled to the engine 111 and the transmission 112 in response to the torque circuit 160 determining the torque demand level is greater than the first threshold torque level and/or has increased above the second threshold torque level. By way of another example, the clutch circuit 158 may be structured to transmit a disengagement signal to the engine clutch 117 and the motor-generator clutch 118 such that (i) the engine 111 is decoupled from the transmission 112 and the motor-generator 116 and (ii) the motor-generator 116 is decoupled from the engine 111, but remains coupled to the transmission 112, in response to the torque circuit 160 determining the torque demand level is less than the first threshold torque level. By way of yet another example, the clutch circuit 158 may be structured to transmit (i) an engagement signal to the engine clutch 117 such that the engine 111 is coupled from the transmission 112 and (ii) a disengagement signal to the motor-generator clutch 118 such that the motor-generator 116 is decoupled from the engine 111, but remains coupled to the transmission 112, in response to the torque circuit 160 determining the engine braking event is present. The motor-generator 116 may thereby be structured to continue utilizing the negative torque level or supply to generate energy for storage within the energy storage device 119 during the engine braking event. By way of still another example, the clutch circuit 158 may be structured to transmit an engagement signal to the engine clutch 117 and the motor-generator clutch 118 such that (i) the engine 111 is coupled to the transmission 112 and the motor-generator 116 and (ii) the motor-generator 116 is coupled to the engine 111 and the transmission 112 in response to the route look-ahead data received from the route look-ahead system 200 indicating that upcoming route characteristics (e.g., an incline, a curve, a speed limit increase, etc.) will likely cause the torque demand level to increase above the second threshold torque level (e.g., preemptive engagement to prevent power delays, etc.).

The stop-start circuit 156 may be structured to transmit commands (e.g., an off or a stop signal; an on, a start, a restart signal, etc.) to the engine controller 148 via the communications interface 170 to turn off, turn on, and/or restart the engine 111. By way of example, the stop-start circuit 156 may be structured to transmit an off signal to the engine controller 148 to turn off the engine 111 in response to at least one of (i) the torque circuit 160 determining the torque demand level for the engine 111 fell below the first threshold torque level and (ii) the clutch circuit 158 disengaging the engine clutch 117. By way of another example, the stop-start circuit 156 may be structured to transmit a restart signal to the engine controller 148 to restart the engine 111 in response to at least one of (i) the torque circuit 160 determining the engine braking event is present (e.g., engine braking is needed from the engine 111 to slow down the vehicle 100, etc.) and (ii) the clutch circuit 158 engaging the engine clutch 117. By way of yet another example, the stop-start circuit 156 may be structured to transmit a restart signal to the engine controller 148 to restart the engine 111 in response to at least one of (i) the torque circuit 160 determining the torque demand level for the engine 111 increased above the second threshold torque level, (ii) the clutch circuit 158 engaging the engine clutch 117, and (iii) the clutch circuit 158 engaging the motor-generator clutch 118. According to an example embodiment, shutting off the engine 111 while the powertrain system 110 is operating at a negative torque demand (e.g., the vehicle 100 is traveling at a speed above a cruise control set speed, while encountering a decline slope, etc.) facilitates increasing fuel efficiency of the vehicle, while still facilitating energy generation with the motor-generator 116. In some embodiments, the stop-start functionality is not provided.

The motor-generator circuit 169 may be structured to transmit commands (e.g., a motoring signal, a generating signal, etc.) to the motor-generator 116 to operate the motor-generator 116 in either a motoring mode, a generating mode, or an off mode. By way of example, the motor-generator circuit 169 may be structured to transmit a motoring signal to the motor-generator 116 such that the motor-generator 116 operates in a motoring mode (e.g., to at least partially provide a torque input to the transmission 112, to the vehicle subsystems 120, a PTO, etc.) in response (i) the clutch circuit 158 engaging the engine clutch 117, (ii) the clutch circuit 158 engaging the motor-generator clutch 118, and (iii) the torque circuit 160 determining the torque demand level for the engine 111 is above the first threshold torque level and/or increased above the second threshold torque level. By way of another example, the motor-generator circuit 169 may be structured to transmit a generating signal to the motor-generator 116 such that the motor-generator 116 operates in a generating mode (e.g., to generate energy from a negative torque supply, etc.) in response (i) the clutch circuit 158 disengaging the engine clutch 117, (ii) the clutch circuit 158 disengaging the motor-generator clutch 118, and (iii) the torque circuit 160 determining the torque demand level for the engine 111 is below the first threshold torque level. By way of yet another example, the motor-generator circuit 169 may be structured to transmit a generating signal to the motor-generator 116 such that the motor-generator 116 operates in a generating mode (e.g., to generate energy from a negative torque supply, etc.) in response (i) the clutch circuit 158 engaging the engine clutch 117, (ii) the clutch circuit 158 disengaging the motor-generator clutch 118, and (iii) the torque circuit 160 determining the engine braking event is present (e.g., engine braking is needed from the engine 111 to slow the vehicle 100, etc.).

Figure 3:
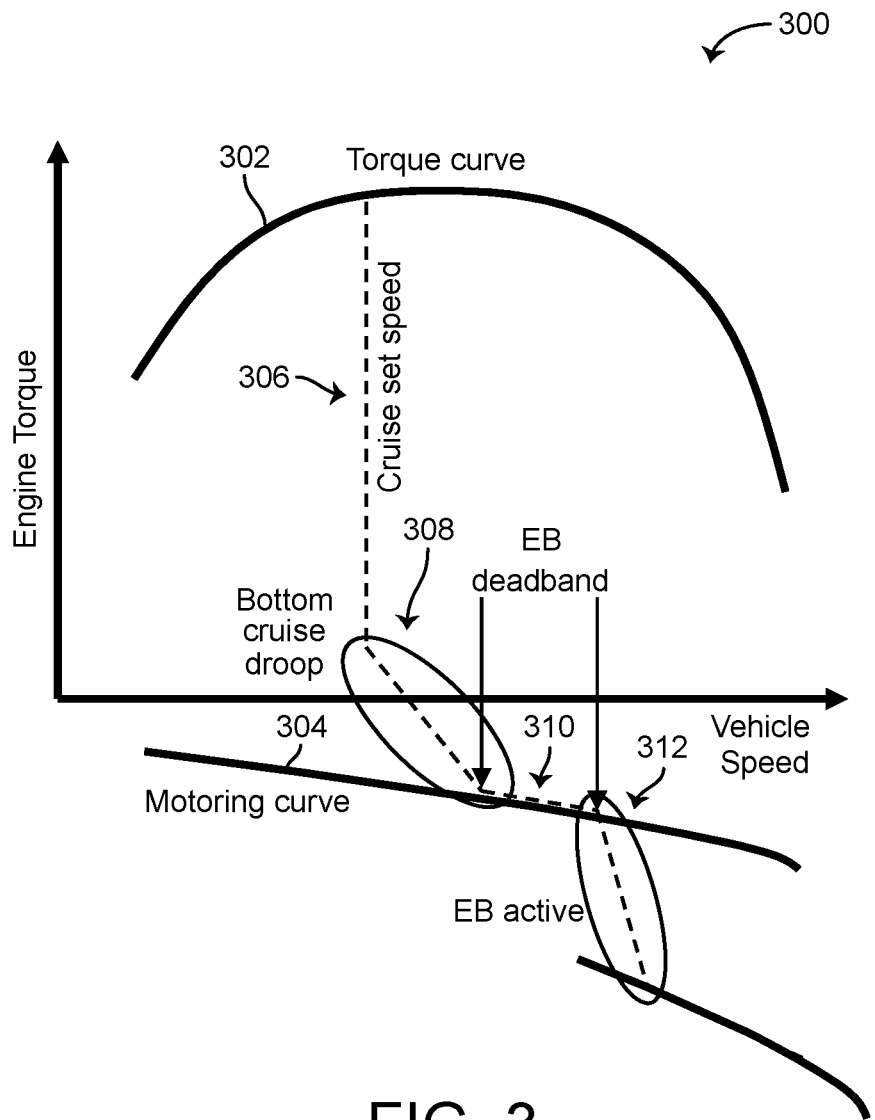
FIG. 3 is a graph of engine torque versus vehicle speed for a hybrid engine system having a motor-generator indirectly coupled to an engine, according to an example embodiment.

Referring not to FIG. 3, a graph 300 of engine torque versus vehicle speed is shown according to an example embodiment. As shown in FIG. 3, the graph 300 includes a torque curve 302, a motoring curve 304, a cruise control set speed 306, a cruise control droop 308, and an engine braking deadband 310 in response to an engine braking event 312, according to one example.

Figure 4:
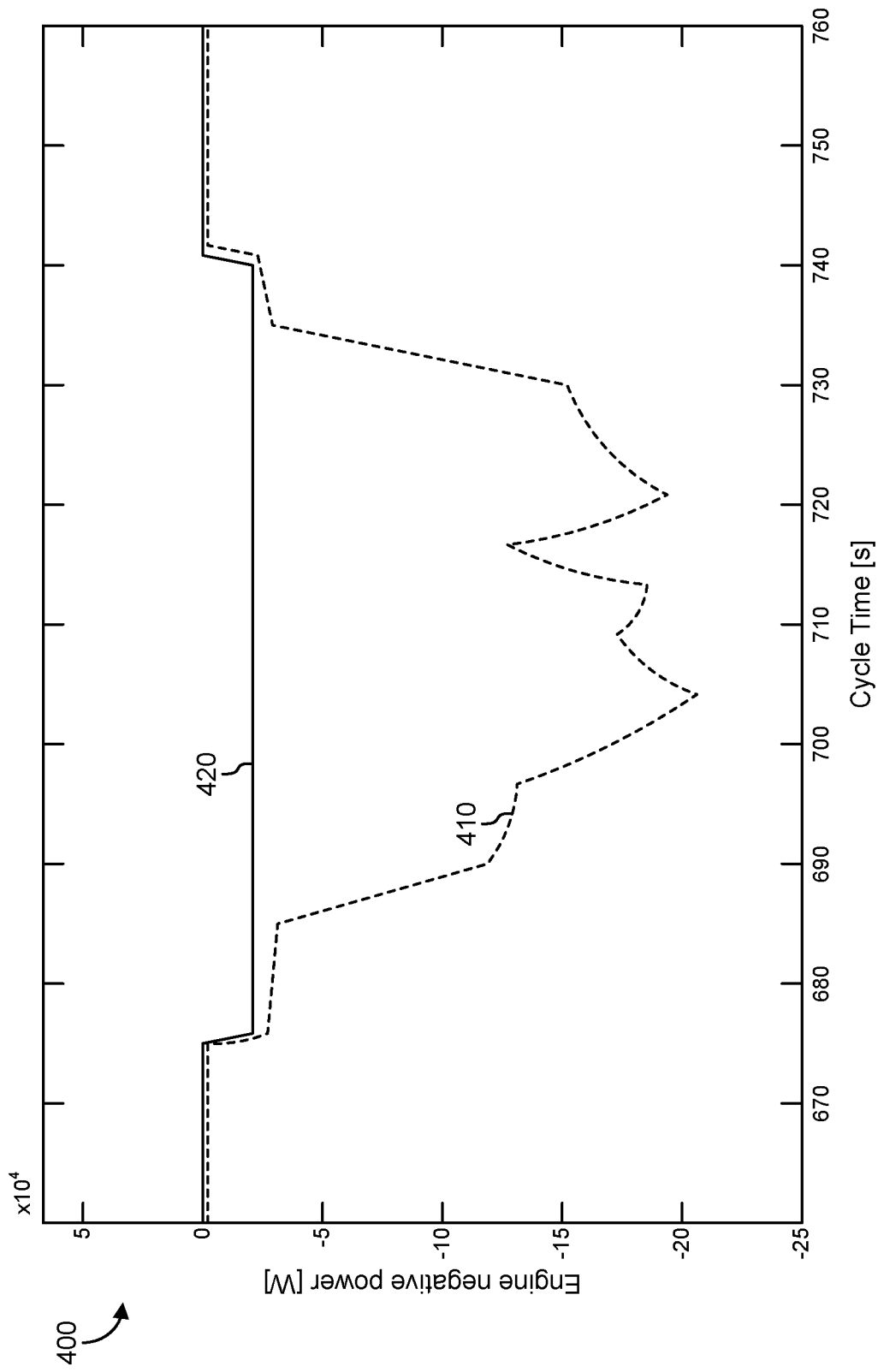
FIG. 4 is a graph of negative engine power over time for a hybrid engine system having a motor-generator directly coupled to an engine, according to an example embodiment.
Figure 5:
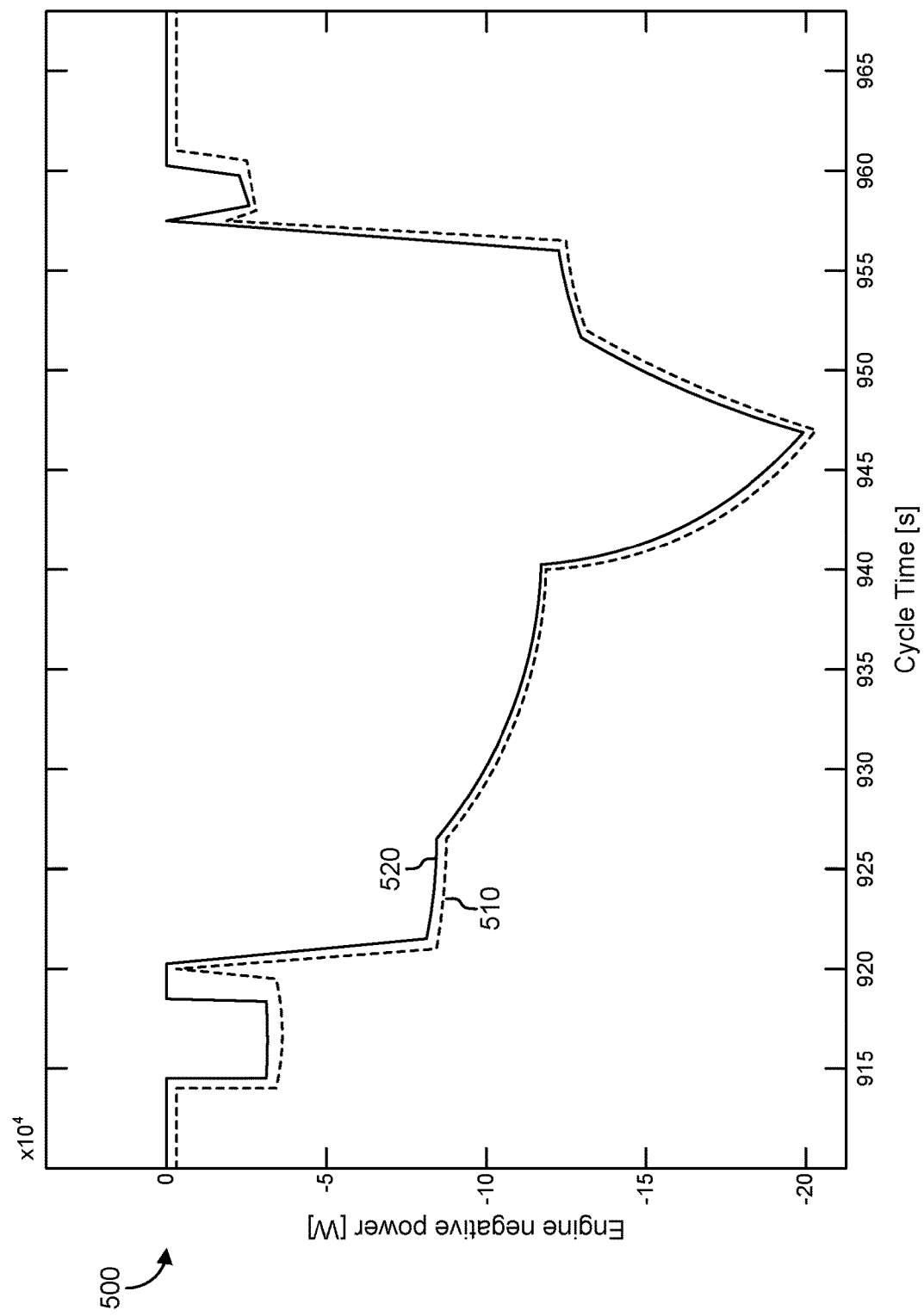
FIG. 5 is a graph of negative engine power over time for a hybrid engine system having a motor-generator indirectly coupled to an engine, according to an example embodiment.

Referring to FIG. 4, a graph 400 of negative engine power versus time for a powertrain system that has an engine and a motor-generator selectively coupled to a transmission via a single clutch (i.e., disengagement of the single clutch decouples both the engine and the motor-generator from the transmission) is shown according to an example embodiment. Referring to FIG. 5, a graph 500 of negative engine power versus time for the powertrain system 110 having the motor-generator 116 selectively coupled to the engine 111 via the motor-generator clutch 118 and the engine 111 selectively coupled to the transmission 112 via the engine clutch 117 is shown according to an example embodiment. As shown in FIG. 4, the graph 400 includes a conventional powertrain curve 410 (e.g., for a non-hybrid powertrain) and a powertrain curve 420 for a powertrain system that has an engine and a motor-generator selectively coupled to a transmission via a single clutch (i.e., cannot perform engine braking when the motor-generator is decoupled from the transmission). As shown in FIG. 5, the graph 500 include a conventional powertrain curve 510 (e.g., for a non-hybrid powertrain) and a powertrain curve 520 for the powertrain system 110 (i.e., can perform engine braking when the motor-generator is decoupled from the engine).

Figure 6:
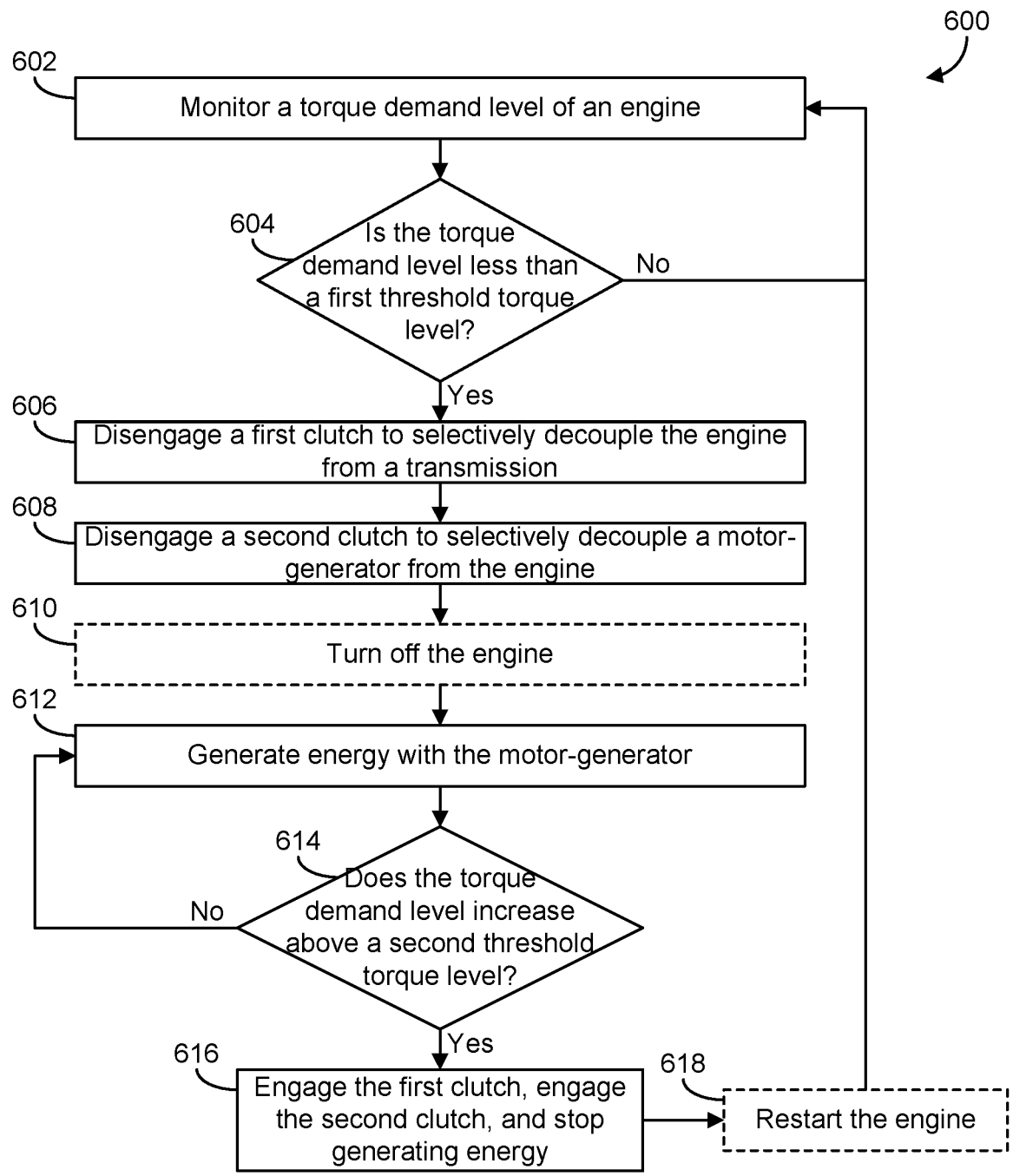
FIG. 6 is a flow diagram of a method for controlling a transmission of a hybrid engine system of a vehicle, according to an example embodiment.

Referring now to FIG. 6, a method 600 for controlling a transmission of a hybrid engine system of a vehicle is shown according to an example embodiment. In one example embodiment, method 600 may be implemented with the vehicle 100 and the transmission controller 150 of FIGS. 1 and 2. As such, method 600 may be described with regard to FIGS. 1 and 2.

At step 602, the transmission controller 150 is structured to monitor a torque demand level of an engine (e.g., the engine 111, etc.). At step 604, the transmission controller 150 is structured to determine whether the torque demand level of the engine is less than or equal to a first threshold torque level. According to an example embodiment, the first threshold torque level is non-positive. By way of example, the first threshold torque level may be less than or equal to zero torque demanded from the engine (e.g., a negative torque demand, etc.). If the torque demand level is greater than the first threshold torque level, the transmission controller 150 is structured to return to step 602. If the torque demand level is less than or equal to the first threshold torque level, the transmission controller 150 is structured to proceed to step 606.

At step 606, the transmission controller 150 is structured to disengage a first clutch (e.g., the engine clutch 117, etc.) to selectively decouple the engine from a transmission (e.g., the transmission 112, etc.). At step 608, the transmission controller 150 is structured to disengage a second clutch (e.g., the motor-generator clutch 118, etc.) to selectively decouple a motor-generator (e.g., the motor-generator 116, etc.) from the engine. According to an example embodiment, the motor-generator is coupled (e.g., directly coupled, etc.) to the transmission. The motor-generator may thereby be structured to utilize a negative torque level or supply (e.g., the torque demanded from the engine is less than zero, the powertrain system 110 does not require any torque input from the engine 111 to maintain a desired speed, while the vehicle 100 is traveling down a hill, while the cruise control set speed is exceeded by the current vehicle speed, etc.) to generate energy for storage in a storage device (e.g., the energy storage device 119, etc.) while the engine is decoupled from the transmission and/or the motor-generator.

At step 610, the transmission controller 150 is optionally structured to transmit an off signal to an engine controller (e.g., the engine controller 148, etc.) to turn off the engine in response to the torque demand level dropping below the first threshold torque level, the first clutch being disengaged, and/or the second clutch being disengaged. At step 612, the motor-generator is structured to generate energy for storage in the energy storage device while decoupled from the engine.

At step 614, the transmission controller 150 is structured to determine whether the torque demand level of the engine increased above a second threshold torque level. According to an example embodiment, the second threshold torque level is selected (e.g., calibrated, set, predefined, etc.) to compensate for clutch engagement delays when a torque input is subsequently desired or required from the engine (e.g., in response to the speed of the vehicle decreasing, in response to an operator input via an accelerator pedal, etc.).

By way of example, the second threshold torque level may be less than the first threshold torque level to eliminate delays in torque provided by the engine due to time delays associated with engaging the first clutch and/or the second clutch. The second threshold torque level may thereby be a negative torque value that is less than the first threshold torque level. By way of another example, the second threshold torque level may be equal to the first threshold torque level. In an alternative embodiment, the second threshold torque level is greater than the first threshold torque level.

If the torque demand level of the engine does not increase above the second threshold torque level, the transmission controller 150 is structured to return to step 612 such that the motor-generator continues to generate energy. If the torque demand level of the engine increased above the second threshold torque level, the transmission controller 150 is structured to proceed to step 616. At step 616, the transmission controller 150 is structured to engage the first clutch to selectively couple the engine to the transmission and engage the second clutch to selectively couple the motor-generator to the engine. The motor-generator may thereafter stop generating energy. In some embodiments, the transmission controller 150 is additionally or alternatively structured to (i) receive route-look ahead data indicative of route characteristics ahead of the vehicle and (ii) preemptively engage the first clutch and/or the second clutch in anticipation of an increased torque demand level (e.g., an approaching hill, etc.). At step 618, the transmission controller 150 is optionally structured to transmit a restart signal to the engine controller to restart the engine (i.e., if the engine was turned off at step 610) to facilitate providing an input torque to the transmission (e.g., to maintain a desired speed, to overcome increased loading, etc.). The engine may thereafter provide input torque to the transmission as necessary to meet the demands from the operator (e.g., based on an accelerator pedal input, a cruise control set speed, etc.).

Figure 7:
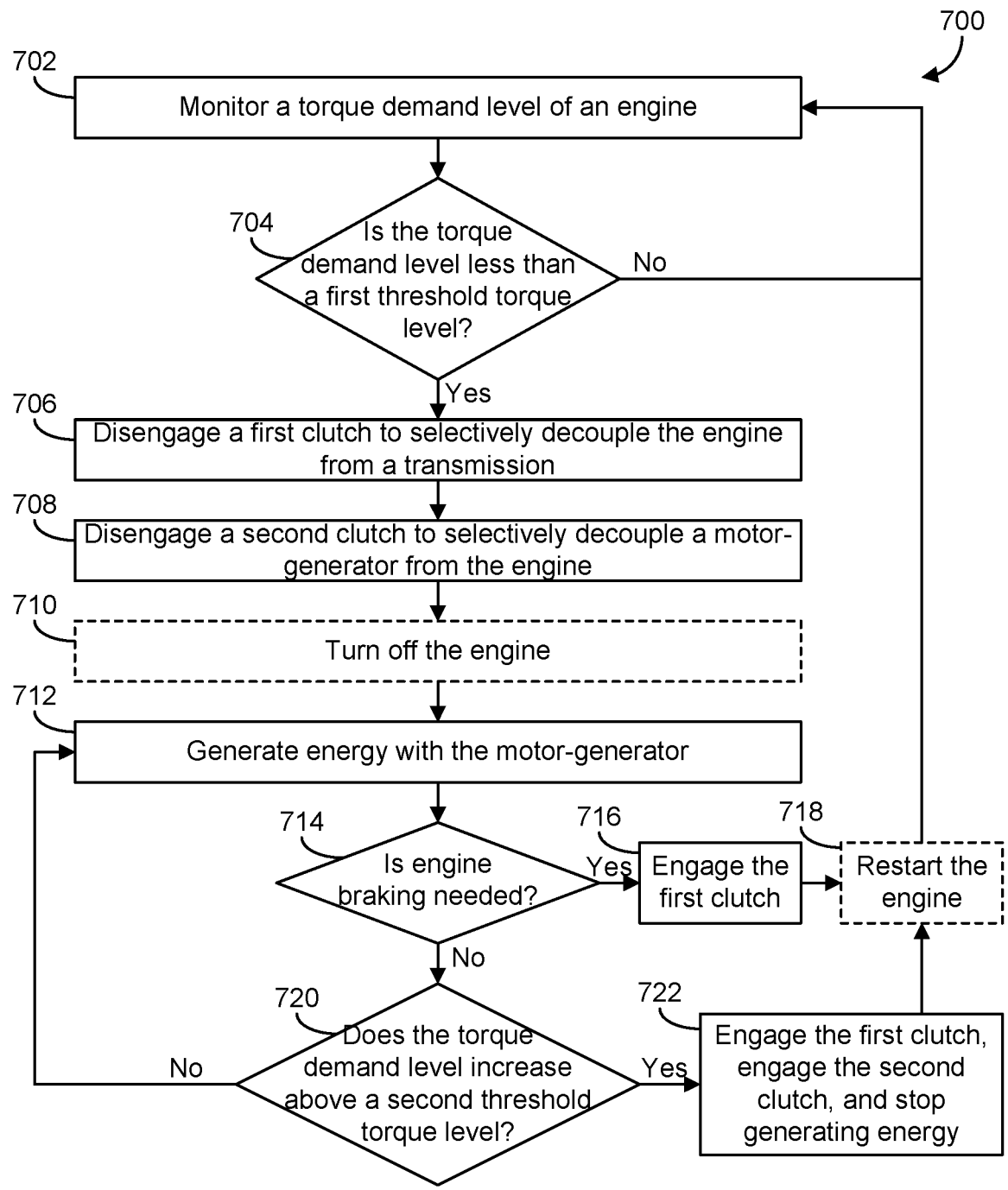
FIG. 7 is a flow diagram of a method for controlling a transmission of a hybrid engine system of a vehicle, according to another example embodiment.

Referring now to FIG. 7, a method 700 for controlling a transmission of a hybrid engine system of a vehicle is shown according to another example embodiment. In one example embodiment, method 700 may be implemented with the vehicle 100 and the transmission controller 150 of FIGS. 1 and 2. As such, method 700 may be described with regard to FIGS. 1 and 2.

At step 702, the transmission controller 150 is structured to monitor a torque demand level of an engine (e.g., the engine 111, etc.). At step 704, the transmission controller 150 is structured to determine whether the torque demand level of the engine is less than or equal to a first threshold torque level. According to an example embodiment, the first threshold torque level is non-positive. By way of example, the first threshold torque level may be less than or equal to zero torque demanded from the engine (e.g., a negative torque demand, etc.). If the torque demand level is greater than the first threshold torque level, the transmission controller 150 is structured to return to step 702. If the torque demand level is less than or equal to the first threshold torque level, the transmission controller 150 is structured to proceed to step 706.

At step 706, the transmission controller 150 is structured to disengage a first clutch (e.g., the engine clutch 117, etc.) to selectively decouple the engine from a transmission (e.g., the transmission 112, etc.). At step 708, the transmission controller 150 is structured to disengage a second clutch (e.g., the motor-generator clutch 118, etc.) to selectively decouple a motor-generator (e.g., the motor-generator 116, etc.) from the engine. According to an example embodiment, the motor-generator is coupled (e.g., directly coupled, etc.)

to the transmission. The motor-generator may thereby be structured to utilize a negative torque level or supply (e.g., the torque demanded from the engine is less than zero, the powertrain system 110 does not require any torque input from the engine 111 to maintain a desired speed, while the vehicle 100 is traveling down a hill, while the cruise control set speed is exceeded by the current vehicle speed, etc.) to generate energy for storage in a storage device (e.g., the energy storage device 119, etc.) while the engine is decoupled from the transmission and/or the motor-generator.

At step 710, the transmission controller 150 is optionally structured to transmit an off signal to an engine controller (e.g., the engine controller 148, etc.) to turn off the engine in response to the torque demand level dropping below the first threshold torque level, the first clutch being disengaged, and/or the second clutch being disengaged. At step 712, the motor-generator is structured to generate energy for storage in the energy storage device while decoupled from the engine.

At step 714, the transmission controller 150 is structured to determine whether an engine braking is present (e.g., engine braking is needed, etc.). According to an example embodiment, the transmission controller 150 is structured to determine that the engine braking event is present based on (i) engine parameters received from an engine controller (e.g., the engine controller 148, a handshake between the transmission controller 150 and the engine controller 148, etc.), (ii) engine parameters determined using adaptive learning techniques (e.g., if the transmission controller 150 is not in data receiving communication with the engine controller 148, etc.), and/or (iii) route look-ahead characteristics received from a route look-ahead system (e.g., the route look-ahead system 200, etc.). By way of example, the engine parameters may include a current vehicle speed, a cruise control set speed, and/or other engine parameters that may not otherwise be readily known by or available to the transmission controller 150. By way of another example, the route look-ahead characteristics may include characteristics of a route the vehicle is currently traveling on that may require engine braking to be used (e.g., a steep hill causing the vehicle to increase in speed above the cruise control set speed, etc.).

If the engine braking event is present, the transmission controller 150 is structured to proceed to step 716 (e.g., in response to the current vehicle speed exceeding the cruise control set speed by more than a threshold speed amount, etc.). If the engine braking event is not present, the transmission controller 150 is structured to proceed to step 720. At step 716, the transmission controller 150 is structured to engage the first clutch to selectively couple the engine to the transmission to facilitate providing the engine braking. At step 718, the transmission controller 150 is optionally structured to transmit a restart signal to the engine controller to restart the engine (i.e., if the engine was turned off at step 710) to facilitate providing the engine braking. The engine may thereafter provide engine braking to the transmission as necessary to meet the demands from the operator (e.g., slow the vehicle down to a cruise control set speed from an increased speed, etc.). According to an example embodiment, the transmission controller 150 is structured to maintain the second clutch in the disengaged configuration during the engine braking event such that the motor-generator remains decoupled from the engine and continues to utilize the negative torque level to generate energy during the engine braking event.

At step 720, the transmission controller 150 is structured to determine whether the torque demand level of the engine increased above a second threshold torque level. According to an example embodiment, the second threshold torque level is selected (e.g., calibrated, set, predefined, etc.) to compensate for clutch engagement delays when a torque input is subsequently desired or required from the engine (e.g., in response to the speed of the vehicle decreasing, in response to an operator input via an accelerator pedal, etc.). By way of example, the second threshold torque level may be less than the first threshold torque level to eliminate delays in torque provided by the engine due to time delays associated with engaging the first clutch and/or the second clutch. The second threshold torque level may thereby be a negative torque value that is less than the first threshold torque level. By way of another example, the second threshold torque level may be equal to the first threshold torque level. In an alternative embodiment, the second threshold torque level is greater than the first threshold torque level.

If the torque demand level of the engine does not increase above the second threshold torque level, the transmission controller 150 is structured to return to step 712 such that the motor-generator continues to generate energy. If the torque demand level of the engine increased above the second threshold torque level, the transmission controller 150 is structured to proceed to step 722. At step 722, the transmission controller 150 is structured to engage the first clutch to selectively couple the engine to the transmission and engage the second clutch to selectively couple the motor-generator to the engine. The motor-generator may thereafter stop generating energy. In some embodiments, the transmission controller 150 is additionally or alternatively structured to (i) receive route-look ahead data indicative of route characteristics ahead of the vehicle and (ii) preemptively engage the first clutch and/or the second clutch in anticipation of an increased torque demand level (e.g., an approaching hill, etc.). The transmission controller 150 may thereafter be optionally structured to transmit a restart signal to the engine controller to restart the engine (i.e., if the engine was turned off at step 710) to facilitate providing an input torque to the transmission (e.g., to maintain a desired speed, to overcome increased loading, etc.). The engine may thereafter provide input torque to the transmission as necessary to meet the demands from the operator (e.g., based on an accelerator pedal input, a cruise control set speed, etc.).

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as processor 152 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer (such as via the transmission controller 150 of FIGS. 1 and 3), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:
1. An apparatus, comprising:
   a torque circuit structured to:
      monitor a torque demand level of an engine; and compare the torque demand level to a threshold torque level; and a clutch circuit structured to:
disengage an engine clutch of a transmission to decouple the engine from the transmission in response to the torque demand level of the engine falling below the threshold torque level; and
disengage a motor-generator clutch of the transmission to decouple a motor-generator from the engine in response to the torque demand level of the engine falling below the threshold torque level, wherein the motor-generator is directly coupled to the transmission such that the motor-generator is structured to utilize a negative torque level to generate energy while the engine is decoupled from the transmission.

2. The apparatus of claim 1, wherein the threshold torque level is non-positive.

3. The apparatus of claim 2, wherein the motor-generator is structured to utilize the negative torque level to generate energy for storage in an energy storage device.

4. The apparatus of claim 3, further comprising a stop-start circuit structured to transmit an off signal to an engine controller to turn the engine off in response to the torque demand level of the engine falling below the threshold torque level.

5. The apparatus of claim 4, wherein the torque circuit is further structured to generate an engine braking signal in response to an engine braking event, wherein the clutch circuit is further structured to engage the engine clutch to couple the engine to the transmission in response to the engine braking signal, and wherein the stop-start circuit is further structured to transmit a restart signal to the engine controller that causes the engine to restart and to provide engine braking.

6. The apparatus of claim 5, wherein the motor-generator is structured to continue utilizing the negative torque level to generate energy during the engine braking event.

7. The apparatus of claim 5, wherein the torque circuit is structured to generate the engine braking signal based on interpreting at least one of (i) engine parameters received from the engine controller, (ii) engine parameters determined using an adaptive learning technique, and (iii) route look-ahead characteristics received from a route look-ahead system.

8. The apparatus of claim 7, wherein the engine parameters include a current vehicle speed and a cruise control set speed.

9. The apparatus of claim 8, wherein the torque circuit is structured to generate the engine braking signal in response to the current vehicle speed exceeding the cruise control set speed by more than a threshold speed amount.

10. The apparatus of claim 4, wherein the clutch circuit is further structured to engage at least one of the engine clutch and the motor-generator clutch in response to at least one of (i) the torque demand level of the engine increasing above a second threshold torque level and (ii) route look-ahead data received from a route look-ahead system indicating that the torque demand level will increase above the second threshold torque level.

11. The apparatus of claim 10, wherein the threshold torque level is a first threshold torque level, and wherein the second threshold torque level is less than the first threshold torque level, wherein engaging at least one of the engine clutch and the motor-generator clutch at the second threshold torque level reduces a clutch engagement delay.

12. The apparatus of claim 10, wherein the stop-start circuit is further structured to transmit a restart signal to the engine controller in response to the torque demand level of the engine increasing above the second threshold torque level, wherein the restart signal causes the engine to restart such that the engine provides a torque input to the transmission.

13. A method, comprising:
monitoring, by a processing circuit, a torque demand level of an engine;
comparing, by the processing circuit, the torque demand level to a first threshold torque level and a second threshold torque level;
disengaging, by the processing circuit, a clutch positioned to selectively couple (i) the engine to a transmission and (ii) the engine to a motor-generator in response to the torque demand level dropping below the first threshold torque level, wherein the first threshold torque level is non-positive, and wherein the motor-generator is coupled to the transmission such that the motor-generator utilizes a negative torque level to generate energy while the engine is decoupled from the transmission; and
engaging, by the processing circuit, the clutch based on a comparison of the torque demand level and the second threshold torque level.

14. The method of claim 13, wherein the clutch includes a first clutch positioned between the engine and the transmission and a second clutch positioned between the engine and the motor-generator, and wherein the comparison indicates that the torque demand level is equal to or greater than the second threshold torque level.

15. The method of claim 13, further comprising transmitting, by the processing circuit to an engine controller, an off signal to turn off the engine in response to the torque demand level dropping below the first threshold torque level.

16. The method of claim 15, further comprising transmitting, by the processing circuit to the engine controller, a restart signal to restart the engine in response to the torque demand level exceeding the second threshold torque level.

17. The method of claim 15, further comprising:
generating, by the processing circuit, an engine braking signal in response to an engine braking event;
engaging, by the processing circuit, the clutch to couple the engine to the transmission in response to the engine braking signal; and
transmitting, by the processing circuit, a restart signal to the engine controller that causes the engine to restart and to provide engine braking, wherein the motor-generator is structured to continue utilizing the negative torque level to generate energy during the engine braking event.

18. A system, comprising:
a controller communicably and operatively coupled to a first clutch and a second clutch of a transmission, the first clutch positioned to selectively couple an engine to the transmission, and the second clutch positioned to selectively couple a motor-generator to the engine, the controller structured to:
monitor a torque demand level of the engine;
compare the torque demand level to a first threshold torque level, wherein the first threshold torque level is non-positive;
disengage the first clutch and the second clutch to decouple the engine from the transmission and the motor-generator from the engine in response to the torque demand level dropping below the first threshold torque level, wherein the motor-generator is coupled to the transmission such that the motor-generator utilizes a negative torque level to generate energy for storage in an energy storage device while the engine is decoupled from the transmission; and transmit an off signal to an engine controller to turn the engine off in response to the torque demand level dropping below the first threshold torque level.

19. The system of claim 18, wherein the controller is further structured to:

compare the torque demand level to a second threshold torque level;

engage at least one of the first clutch and the second clutch in response to the torque demand level increasing above the second threshold torque level; and transmit a restart signal to the engine controller to restart the engine in response to the torque demand level increasing above the second threshold torque level.

20. The system of claim 18, wherein the controller is further structured to:

generate an engine braking signal in response to an engine braking event;

engage the first clutch to couple the engine to the transmission in response to the engine braking signal; and transmit a restart signal to the engine controller that causes the engine to restart and to provide engine braking, wherein the motor-generator is structured to continue utilizing the negative torque level to generate energy during the engine braking event.

* * * * *